United States Patent Office

Re. 28,086
Reissued July 30, 1974

28,086

APPARATUS FOR MAKING A THERMALLY INSULATING JOINT CONSTRUCTION

William H. Holliday and Layle B. Barker, Richmond, Va., assignors to Reynolds Metals Company, Richmond, Va.

Original No. 3,624,885, dated Dec. 7, 1971, Ser. No. 877,212, Nov. 17, 1969. Application for reissue Sept. 25, 1973, Ser. No. 400,533

Int. Cl. B23p *17/00, 19/00*

U.S. Cl. 29—200 A 11 Claims

Matter enclosed in heavy brackets [ ] appears in the original patent but forms no part of this reissue specification; matter printed in italics indicates the additions made by reissue.

ABSTRACT OF THE DISCLOSURE

A head assembly having a nozzle for dispensing a thermal insulating material is supported at a dispensing station and a dual-purpose device is provided and used for supporting and moving straight rigid members in a rectilinear path past the dispensing station so that an open channel in each member may be filled by gravity with the thermal insulating material. A guide assembly is also provided and adjusted so that members of irregular cross-sectional configuration may be easily guided along the rectilinear path.

BACKGROUND OF THE INVENTION

In the manufacture of window units, glass door units, and the like, panes of glass are supported in frame members or joint constructions which usually employ a thermal insulating material which is placed in integral channels provided in the frame members to thermally isolate the glass in each instance from its supporting structure and for reasons well known in the art. One highly successful technique or method which may be used in making a thermally insulating joint construction is taught in Pat. No. 3,204,324 to Nilsen; however, with such a simple method it is important that an apparatus be utilized which will assure that the cost of the final joint construction is kept at a bare minimum and that the apparatus be capable of working with metal members of different sizes and having different irregular cross-sectional configurations.

SUMMARY

This invention provides an improved apparatus for making a thermally insulating joint construction which utilizes a head assembly having a nozzle for dispensing a thermal insulating material therethrough. The nozzle is supported at a dispensing station and a dual purpose device is provided and used for supporting and moving elongated straight rigid members in a rectilinear path past a dispensing station so that an open channel in each member may be filled by gravity with the thermal insulating material. An adjustable guide assembly is also provided as a part of the apparatus and adjusted so that members of different sizes and of irregular and substantially constant cross-sectional configurations may be easily guided along the rectilinear path beneath the dispensing station.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which.

DESCRIPTION OF ILLUSTRATED EMBODIMENTS

Figures 1, 2, 3:
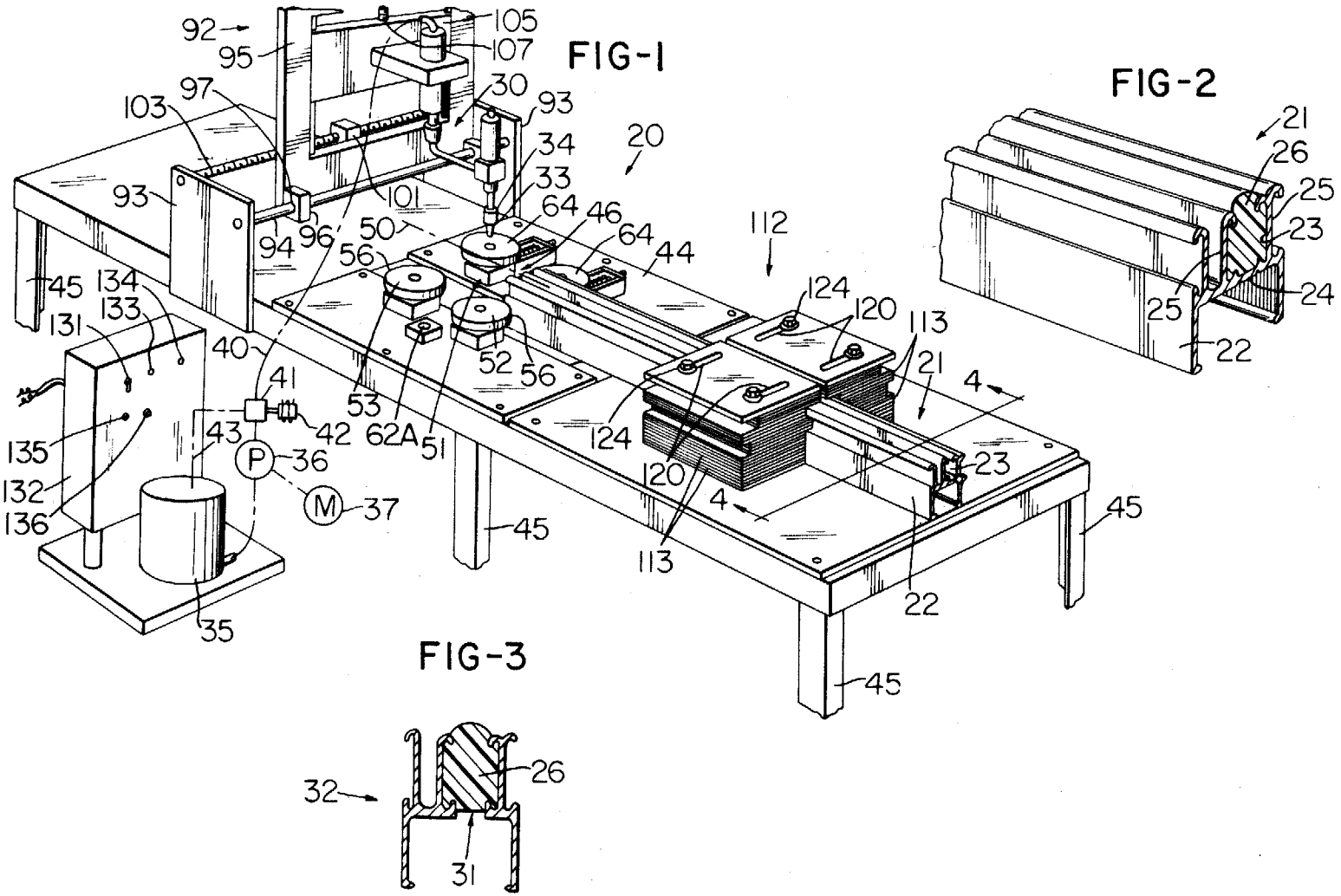
FIG. 1 is a perspective view with parts broken away illustrating one exemplary embodiment of the apparatus of this invention.
FIG. 2 is a fragmentary perspective view with parts in cross section illustrating a typical joint construction made utilizing the apparatus of FIG. 1.
FIG. 3 is a cross-sectional view of the joint construction of FIG. 2 after removal of an interconnecting metal strip to define a joint construction comprised of a pair of side members fixed in spaced relation against opposite side portions of an elongated substantially rigid thermal insulating material.

Reference is now made to FIG. 1 of the drawings which illustrates one exemplary embodiment of the apparatus 20 of this invention which is utilized to make an exemplary thermally insulating joint construction 21, also see FIG. 2. The joint construction 21 is comprised of an elongated straight rigid member 22 which may be made of a metallic material using any suitable process such as roll forming, extrusion, and the like. The member 22 has an upwardly open channel 23 provided therein as an integral part thereof and channel 23 is of substantially U-shaped cross-sectional configuration and defined by a base portion 24 and a par of legs 25 extending outwardly, i.e., upwardly in this example, therefrom.

The joint construction 21 has a thermally insulating plastic material 26 which is introduced into the channel 23 by a head assembly 30 of the apparatus 20 in a manner to be described in detail subsequently and the plastic material is cured and hence solidified in position as an integral part of member 21. Once the plastic material 26 is cured in the channel 23 the base portion 24 of the member 22 is removed as illustrated at 31 in FIG. 3 to thereby define a completed joint construction essentially as taught by the method of Pat. No. 3,204,324 wherein a thermally insulating structure designated by the reference numeral 32 is defined having a pair of metallic members fixed in spaced relation on opposite sides of the solidified thermal insulating material 26.

The apparatus 20 is of optimum simplicity and has a nozzle 33 comprising its head assembly 30. The nozzle 33 has a collar assembly 34 which enables adjustment of the effective area of its outlet to enable more precise control of the amount or rate of flow of the thermal insulating material from the nozzle 33.

The head assembly 30 is operatively connected to a suitable supply or reservoir 35 of the thermal insulating material 26 which is maintained in liquid form and a pump 36, driven by an adjustable speed electric motor 37, is provided for pumping the plastic material 26 through a line 40 to the head assembly 30 for dispensing through the dispensing nozzle 33. The flow through the line 40 to the head assembly 30 is controlled by a valve 41 which has flow therethrough controlled by an electrically operated solenoid 42. To provide optimum operating efficiency and immediate flow through nozzle 33 once said flow is desired, the pump 36 is operated continuously and flow of plastic material 26 to the head assembly 30 is controlled by the solenoid operated valve 41 which either allows flow to the head assembly 30 through line 40 or bypass flow to the reservoir 35 through a bypass line 43 connected between suitable ports in the valve 41 and the reservoir. The valve 41 may be of any suitable known construction to provide operation as presented above whereby such valve will not be described in more detail.

The apparatus 20 comprises a substantially horizontally arranged support or worktable 44 which is supported at a convenient level or height above an associated floor by a plurality of legs 45. A dual-purpose device designated generally by the reference numeral 46 is supported by the worktable 44 at a position beneath and in close proximity to the head assembly 30. The device 46 is utilized to simultaneously support and move each straight rigid member 22 is a rectilinear path 50 past a dispensing station 51, which is defined by the fixed position of the terminal tip of the nozzle 33, so that the open channel 23 in each member 22 is moved in alignment vertically beneath the nozzle 33 to enable the deposition or gravity flow of plastic material 26 into such channel 23.

Figure 6:
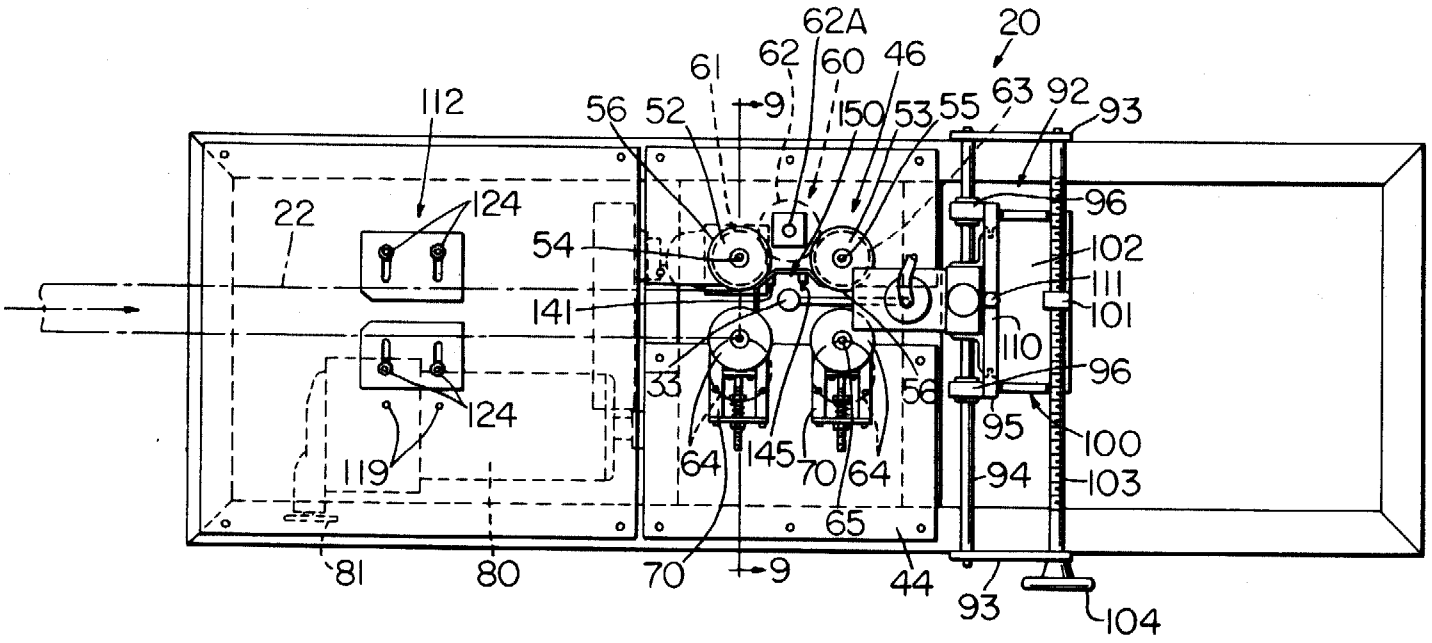
FIG. 6 is a top plan view of the apparatus of FIG. 1.
Figure 7:
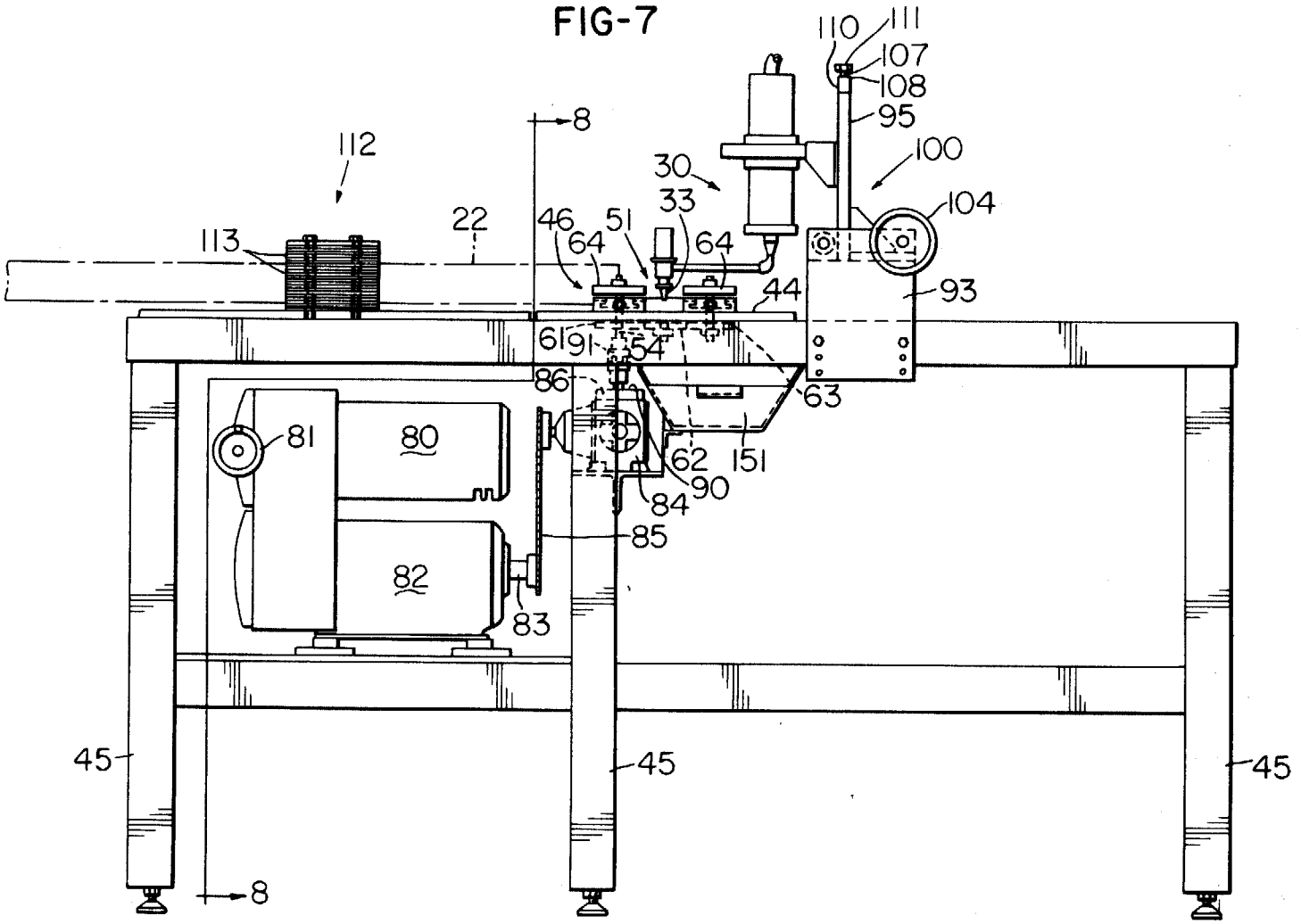
FIG. 7 is a side elevation of the apparatus of FIG. 1, *but showing the guide assembly adjusted so that the member being filled is elevated;*

As seen particularly in FIGS. 6 and 7 of the drawings the device 46 comprises a pair of driving rollers 52 and 53 which are fixed to vertical shafts 54 and 55 respectively whereby each roller 52 and 53 is rotatable about an associated fixed vertical axis. Each roller 52 and 53 has a right circular cylindrical high-friction driving surface 56 which is comprised of a suitable friction material and each surface 56 engages an associated side of each member 22 introduced into the apparatus 20 to move or drive such member along the rectilinear path 50 and in a manner to be described in more detail subsequently. To assure maximum operating efficiency, each shaft 54 and 55 is rotatably supported by a suitable antifriction-bearing fixed to the worktable 44.

The shaft 54 which has the driving roller 52 fixed thereto is in the form of a drive shaft and a gear assembly 60 is provided for driving the shaft 55. The gear assembly 60 is comprised of a driving gear 61 suitably fixed to the shaft 54 for simultaneous rotation therewith, an intermediate idler gear 62 rotatably supported on a fixed shaft 62A, and a driven gear 63 fixed to the shaft 55. The gears 61–63 cooperate so that once the shaft 54 is rotated the shaft 55 is also simultaneously rotated therewith to thereby rotate rollers 52 and 53 which as previously indicated are considered driving rollers because they provide the motive force for moving each member 22 as it is fed into apparatus 20.

Figure 9:
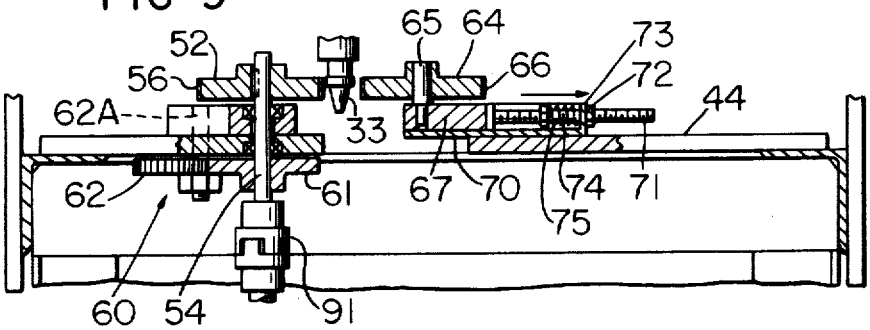
FIG. 9 is an enlarged view with parts in cross section and parts broken away taken essentially on the line 9—9 of FIG. 6.

Each roller 52 and 53 has a backup roller 64 associating therewith and each roller 64 is fixed to an associated rotatable vertical shaft 65. Each roller 64 has a right circular cylindrical surface 66, see FIG. 9, which is adapted to engage the side of each elongated member 22 arranged opposite the side engaged by rollers 52 and 53. Each roller 64 has its surface 66 yieldingly urged against member 22 whereby each member 22 is effectively yieldingly clamped between the driving rollers and the backup rollers and upon rotating the driving rollers the member 22 is supported vertically by cylindrical surfaces 56 and 66 and moved horizontally.

Each shaft 65 is rotatably supported on a block 67 which is horizontally slidable on a support 70 which is fixed to the worktable 44 whereby each backup roller 64 is slidable toward and away from an associated oppositely arranged roller 52 and 53. Each block 67 has a device for urging such block and hence its backup roller toward an associated driving roller and in this example such device comprises a horizontally slidable rod 71 which has one end fixed to the block 67 and its opposite end extending through an opening 72 in an upstanding flange 73 comprising the support 70. The rod has a smooth central portion 74 which slides freely through opening 72 and is provided with a pair of nuts which are threaded in position on rod 71 adjacent opposite ends of the smooth central portion and with the rod 71 extending through opening 72 the nuts limit movement of such rod and hence the associated backup roller toward and away from its associated driving roller.

Urging means in the form of a compression spring 75 is provided and the spring 75 acts between flange 73 and one of the nuts on rod 71 to yieldingly urge the associated block 67 and backup roller 64 toward an associated driving roller and against a side portion of an elongated member 22 being processed by the apparatus 20 of this invention. The plain central portion 74 on rod 71 and the use of compression spring 75 enables the moving device 46 to accommodate elongated members 22 having different widths while still providing precise movement past the dispensing station 51.

Reference is now made to FIG. 7 of the drawings which best illustrates the drive system for the moving device 46. In particular, it will be seen that an electric motor 80 is provided which has a manually adjustable speed control 81. The motor 80 is operatively connected to a gear box assembly 82 which has a shaft 83 extending therefrom and a nonslip chain assembly 85 operatively connects the shaft to a gear reduction unit 84. A clutch 86 is provided and connected between the drive shaft 54 and the gear reduction unit 84 and the clutch is operated by an electric solenoid 90. With the clutch disengaged a member 22 may be freely moved through the device 46 for set-up and alignment purposes. It will also be noted that a universal joint 91 is installed in the drive shaft 54 to assure smooth operation of the drive system for the moving device 46.

Figure 8:
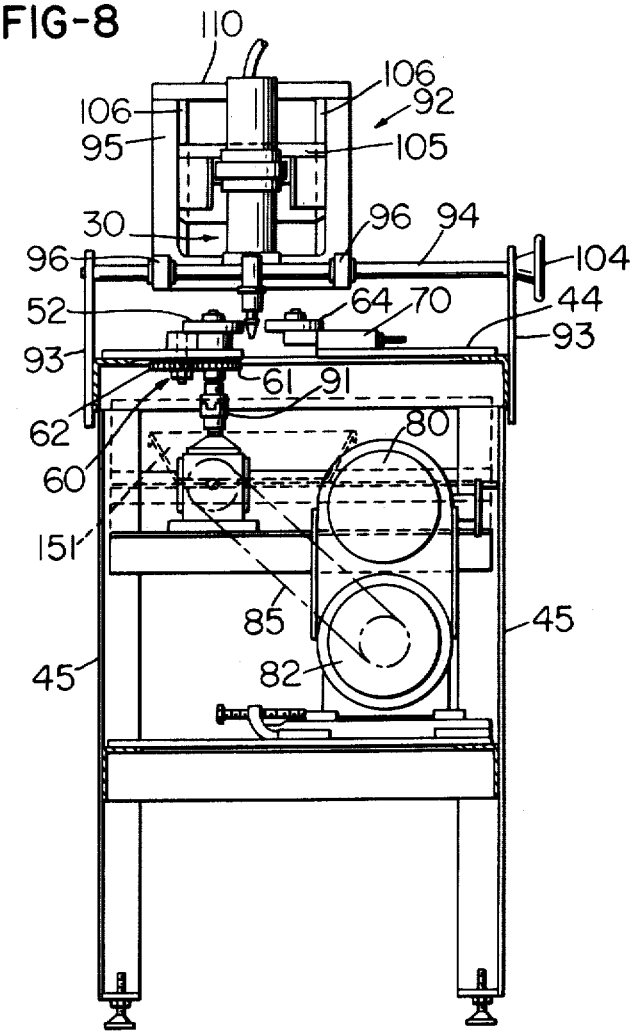
FIG. 8 is a view taken essentially on the line 8—8 of FIG. 7.

Reference is now made to FIGS. 1, 6 and 8 of the drawings which illustrate an assembly 92 for positioning the head assembly 30 relative to the rectilinear path 50 to enable precise alignment of the nozzle 33 above the channel 23 of each elongated member 22 to be processed by the apparatus 20. The assembly 92 comprises a pair of vertical support plates 93 suitably fixed against opposite side edges of the worktable 44. A smooth support rod 94 is provided and has its opposite ends fixed to the plates 93 and is adapted to carry a slide assembly.

The head assembly 30 is supported on a vertical support 95 which has a pair of support blocks 96 suitably fixed thereto with each support block having a cylindrical opening 97 extending therethrough and the rod 94 extends through the openings 97 in the support blocks 96. Thus, the support 95 is supported by its support blocks 96 on the rod 94.

As seen particularly in FIG. 6 of the drawings a plate assembly 100 is fixed to the support 95 and has a threaded nut portion 101 suitably fixed to the rear portion 102 thereof. A threaded rod 103 is threaded through the nut 101 and has its opposite ends supported for free rotation on the support plates 93. The rod 103 has a hand wheel 104 fixed to one end thereof which enables easy turning of such rod whereby upon turning such wheel in one direction the vertical support 95 is moved in one direction across the rectilinear path 50 and upon turning the wheel in an opposite direction the vertical support 95 is moved in an opposite direction across path 50. The wheel 104 enables precise horizontal positioning of the nozzle 33.

The support 95 also has a slide 105 which is supported for vertical sliding movements by a pair of vertical tracks 106 provided in spaced relation and cooperating with opposed side edges of slide 105. A threaded rod 107 is threadedly fastened to the top portion of the slide and has its upper portion extending through an opening 108, see FIG. 7, in a horizontal beam 110 comprising the top portion of the support 95, see FIGS. 6 and 8. A threaded nut 111 is threaded on the top portion of the rod 107 so that upon threading the nut in one direction the slide 105 and hence nozzle 33 is moved downwardly and upon threading the nut 111 in an opposite direction the slide 105 and nozzle 33 is moved upwardly. Thus, it is seen that the support 95 with its slide 105 enables precise positioning of a head assembly 30 and hence the nozzle 33 both vertically and horizontally in a direction transverse the horizontal rectilinear path 50 and in this example the horizontal positioning is perpendicular to such path.

Figure 4:
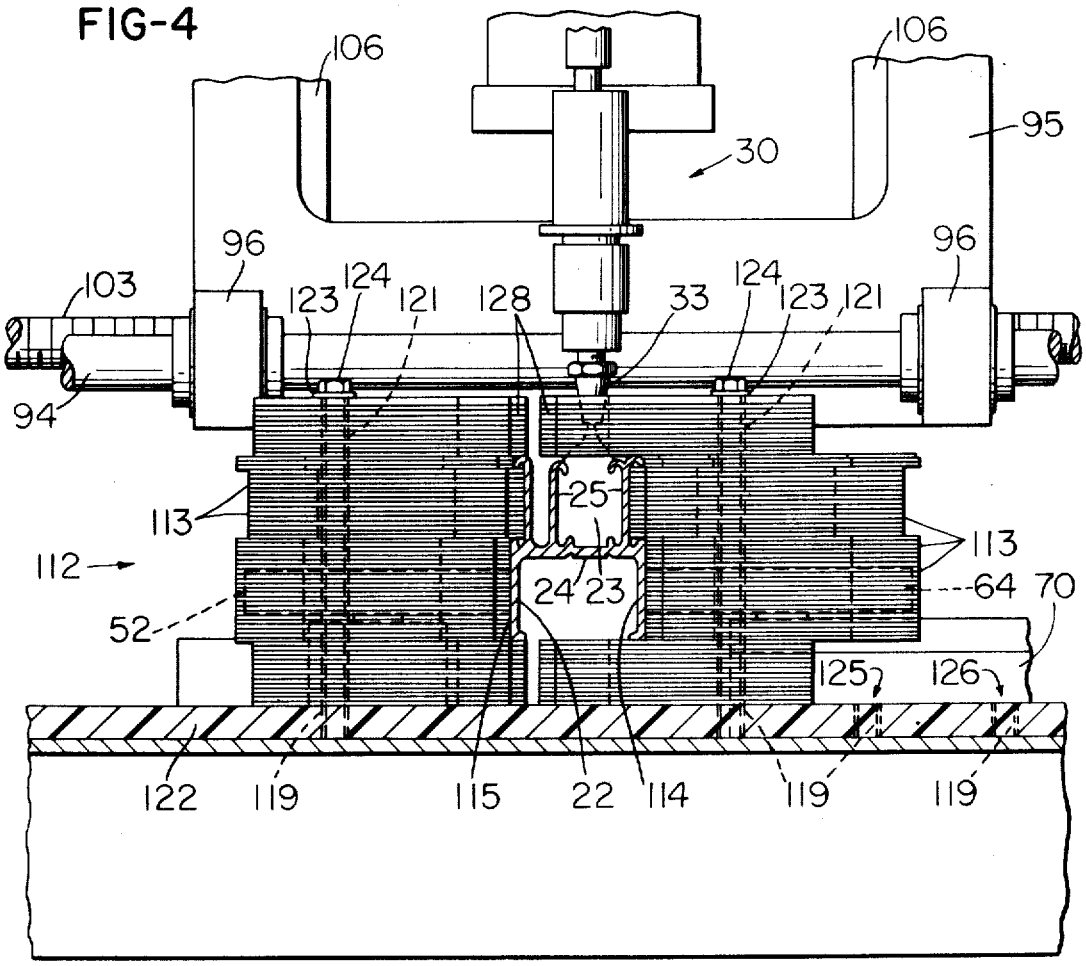
FIG. 4 is an enlarged view with parts in cross section and parts broken away taken essentially on the line 4—4 of FIG. 1 and particularly illustrating an exemplary guide assembly comprising the apparatus of FIG. 1, *but showing the guide assembly adjusted so that the member being filled is elevated;*

Reference is now made to FIGS. 1 and 4 of the drawings which illustrate one exemplary embodiment of an adjustable guide block assembly which is designated generally by the reference numeral 112 and is utilized to guide each straight rigid member 22 through the apparatus 20 so that its open channel 23 is arranged in aligned relation beneath the nozzle 33 to enable dispensing by gravity of the plastic material 26 within the channel 23 and in the manner previously mentioned. As will be apparent from the drawings the member 22 is a rigid member and has an irregular cross-sectional configuration yet the assembly 112 guides such member 22 so that it moves smoothly along the rectilinear path 50 with minimum tendency to bind or be retarded. Further, the unique construction of the assembly 112 enables easy adjustment thereof to conform to a member, such as member 22, which may have a highly irregular contour so that as the member is pulled through the apparatus 20 by the device 46 it will not tend to rotate or tend to move at an angle to the rectilinear path 50.

Figure 5:
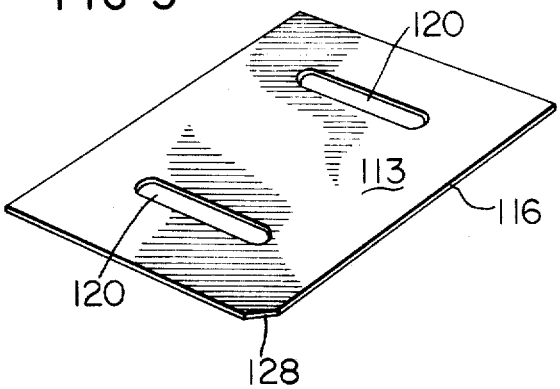
FIG. 5 is a perspective view of a typical sheet comprising the guide assembly of FIG. 4.

Each assembly 112 is comprised of a plurality of elements or sheets 113 which cooperate to define guide surfaces as shown at 114 and 115 corresponding in configuration to opposed surfaces of the member 112. As seen in FIG. 5, each sheet 113 has an edge surface 116 which is preferably made of an antifriction nonmetallic material. Each sheet 113 also has a pair of elongated slots 120 extending therethrough so that with the assembly 112 arranged in supporting relation on the worktable 44 the slots 120 are arranged transverse, i.e., perpendicular in this example, to the rectilinear path 50.

The assembly 112 has a plurality of clamping devices or rods 121 each extending through an associated elongated slot 120 and each rod 121 extends through the slots 120 in a stack of sheets and is threaded into an associated threaded opening 119 in a member 122 which is fixed to the worktable 44. Each rod 121 has a washer 123 associating therewith and a nut 124 threaded thereon at its upper end portion which enables the sheets 113 to be held in stacked and aligned relation on opposite sides of an associated elongated member 22 after individual adjustment of each sheet 113 to enable free or substantially obstructed sliding movement of the member 22 through the guide assembly 112.

Irrespective of the cross-sectional configuration of elongated members being processed by the apparatus 20, the sheets 113 are moved apart and a member 22 is installed in position through the assembly so that an associated channel to be filled with thermoplastic material is arranged vertically beneath the nozzle 33. With the member 22 thus positioned the sheets 113 are then moved lightly against opposed surfaces of the elongated member 22 and because each sheet 113 is comparatively thin as compared to the overall height of an associated vertical surface of a member 22, it will be seen that the sheets 113 on each side of a particular member may be arranged as illustrated in FIG. 4 so that they will follow the outer surface contour thereof. Once the sheets 113 have been adjusted on opposite sides of member 22 the nuts 124 are tightened and the member 22 is retracted whereupon the apparatus 20 may then be started to provide flow of plastic material 26 through its nozzle 33 while moving the elongated member 22 through the apparatus 20 with the supporting and moving device 46 and thereby fill the central channel 23 and define a joint construction of the character illustrated in FIG. 2.

The member 122 may also be provided with a plurality of sets of threaded openings 119 as indicated at 125 and 126 in FIG. 4 with each set being spaced a different distance from the driving rollers 52 and 53 to accommodate members 22 having larger widths.

As will be apparent from FIG. 5 of the drawings each of the sheets 113 has a beveled or inclined surface 128 defining the forward end of its substantially planar surface 116 and the beveled surface 128 enables easy insertion or feeding of the forward end of associated elongated members 22 into the assembly 112 to enable easy processing through the apparatus 20. In the previous description the surface 116 was described as an antifriction surface; however, it will be appreciated that such surface may be provided as a coating or on a strip fixed to the main portion of the sheet 113 or the entire sheet may be made of a suitable antifriction material.

Figure 10:
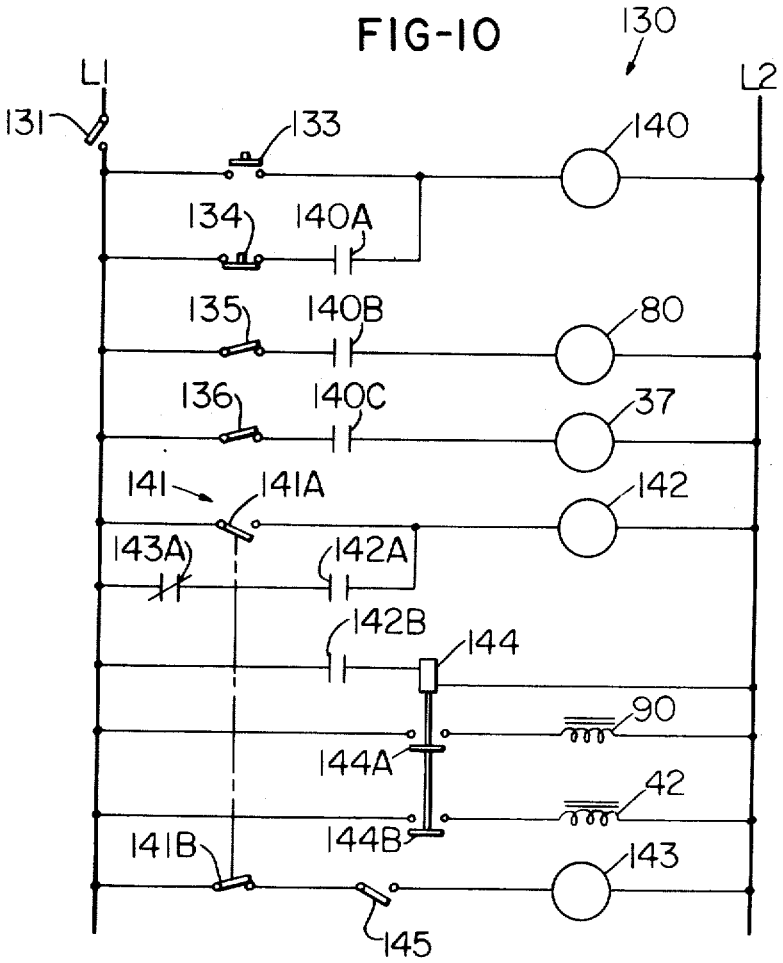
FIG. 10 is a schematic diagram illustrating an electrical system which may be utilized to provide substantially automatic operation of the apparatus of FIG. 1.

The apparatus 20 may be provided with an electrical control system 130, see FIG. 10, for starting the moving device 46 and flow of the plastic material 26 through the nozzle 33 once the forward end portion of each member 22 is spaced adjacent the dispensing station 51 and stopping the moving device 46 and flow of plastic material once the terminal end portion of each member 22 is moved past such dispensing station. The electrical control system 130 comprises a pair of electrical power supply lines $L_1$ and $L_2$ and is provided with a main switch 131 which is suitably located on a control panel 132, see FIG. 1. A main momentary start button 133 is also provided together with an emergency stop button 134 which is provided as a safety measure.

The electrical system 130 may also be provided with a normally closed manually operated control switch 135 which is operatively connected to the electric motor 80 which serves as the prime mover for the moving device 46 and another normally closed manually operated switch 136 which is operatively connected to the motor 37 used to drive the pump 36 which pumps plastic material 26 through the nozzle 33. The switches 135 and 136 enable selective operation of the motors 80 and 37 respectively and may be utilized during set up and testing of the overall apparatus 20.

To provide automatic operation of the apparatus 20 once a member 22 is inserted through the guide assembly 112 toward the dispensing station the switches 135 and 136 are left in their normally closed positions whereupon the main switch 131 is closed and the momentary start button 133 actuated closed. Actuating button 133 energizes a control relay 140 causing its normally open contacts 140A, 140B and 140C to close.

Closing contacts 140A completes a holding circuit to the relay 140 to keep it energized once the start button 133 is released, closing contacts 140B starts the motor 80 which powers the moving device 46, and closing contacts 140C starts the motor 37 which drives the pump 36 which pumps plastic material 26. At this point, the motor 80 merely drives its gear box assembly 82 and gear reduction unit 84; however, the moving device 46 has not been energized yet. Further, although the pump 36 is operating the solenoid 42 has its valve 41 in its bypass condition whereby plastic material 26 is being recirculated through line 43 to the reservoir 35.

Once an elongated member 22 is inserted through the guide block assembly 112 it is moved forwardly until it is clamped between roller 52 and its backup roller 64 and because the driving rollers 52 and 53 are not yet coupled to the motor 80, gear box assembly 82, and gear reduction unit 84 the member 22 is easily inserted into position so that it trips a sensing device in the form of a limit switch 141 (also see FIG. 6) which is arranged immediately ahead of the dispensing station 51. The limit switch 141 has contacts 141A which are closed by the member 22 urging thereagainst and directly mechanically coupled contacts 141B which are simultaneously opened as its contacts 141A are closed.

Closing contacts 141A energizes a control relay 142 to thereby close its normally open contacts 142A and 142B. Closing contacts 142A completes a holding circuit through a normally closed contact 143A of another control relay 143, to be subsequently described, to keep the relay 142 energized and closing contacts 142B energizes a solenoid operated times 144 to close contacts 144A and 144B of such timer.

Closing contacts 144A energizes solenoid 90 to the clutch 86 which causes the drive shaft 54 to be directly coupled to the motor 80 and thereby enable the moving device 46 to move the member 22 beneath the nozzle 33 at the dispensing station 51, and closing contacts 144B energizes the solenoid 42 which diverts a spool in the valve 41 causing flow of plastic material through the nozzle 33. Thus, it is seen that energizing control relay 142 causes simultaneous movement of member 22 past station 51 and gravity flow of plastic material into its channel 23.

As the forward end portion of member 22 moves beyond the limit switch 141 it also engages and trips another sensing device in the form of a limit switch 145 arranged downstream of the dispensing station and the limit switch 145 is used to energize the control relay 143, previously mentioned. However, even though switch 145 is actuated it is ineffective because it is in series with contacts 141B of switch 141 whereby switch 145 will only be effective in energizing relay 143 after the terminal end of a particular member moves beyond the switch 141.

As the terminal end of a member 22 moves past switch 141 its contacts 141B return to their normally closed positions whereupon the limit switch 145 is now effective in energizing the control relay 143. As relay 143 is energized its normally closed contacts 143A are opened which deenergizes the control relay 142 and hence deenergizes the timer 144. However, the timer 144 has a built-in time delay and its contacts 144A and 144B do not open until the time set thereon whereupon both solenoids 42 and 90 remain energized for the time period set on timer 144 and this time interval is adjusted to assure that the member 22 is moved past the driving roller 53 and its associated backup roller 64. Once the time interval set on the timer 144 has elapsed its contacts 144A and 144B are opened whereupon the solenoids 42 and 90 are deenergized to stop the moving device 46 and simultaneously stop flow of plastic material 26 through nozzle 33.

With the control system 130, it is a simple matter to insert or introduce each member 22 between the cooperating rollers of the moving device 46 whereupon the limit switches 141 and 145 cooperate to automatically move each member 22 through the apparatus 20 while filling its channel 23 with plastic material 26. Once the terminal end of each member 22 moves past the dispensing station 51 the entire system automatically stops until another member is introduced in the manner previously described.

As will be apparent from FIG. 6 of the drawings there is a short distance indicated at 150 between the switch 141 and the dispensing station 51 whereby as the forward end of a particular member 22 energizes switch 141, control relay 142, and hence solenoid 42 there is an immediate flow of plastic material out of the nozzle 33 which is wasted until such time that channel 23 of such member is in position to receive the plastic material. The amount of plastic material wasted is quite small and is caught in a small container 151 placed immediately under the dispensing station 51. However, it is desired that the extreme forward end of each member, have plastic material deposited therein whereby the small waste is tolerated.

As will be apparent from FIG. 6 of the drawings the limit switch 145 is in close proximity to the limit switch 141 and both switches are arranged immediately adjacent the dispensing station 51. As the terminal end of each member 22 moves past the limit switch 141, the relay 143 is energized immediately to thereby subsequently deenergize relay 142 through its normally open contacts 143A; however, the solenoid 42 is not deenergized until the timer 144 times out. Once again a small amount of plastic material is wasted and caught in the container 151 after complete filling of the terminal end portion of an associated channel 23.

In the exemplary embodiment of the invention illustrated in FIGS. 1 and 4, the guide assembly 112 is provided with bolts 121 having nuts 124 associated therewith which enable holding the sheets 113 in position in the manner previously described. However, the use of threaded bolts 121 and nuts 124 result in delayed fastening of sheets 113 in position on opposite sides of elongated member 22 whereby in some applications it may be desirable to provide a quick-acting clamp device as shown in FIG. 11 of the drawings to enable rapid clamping of each stack of sheets once its sheets 113 have been individually positioned.

Figure 11:
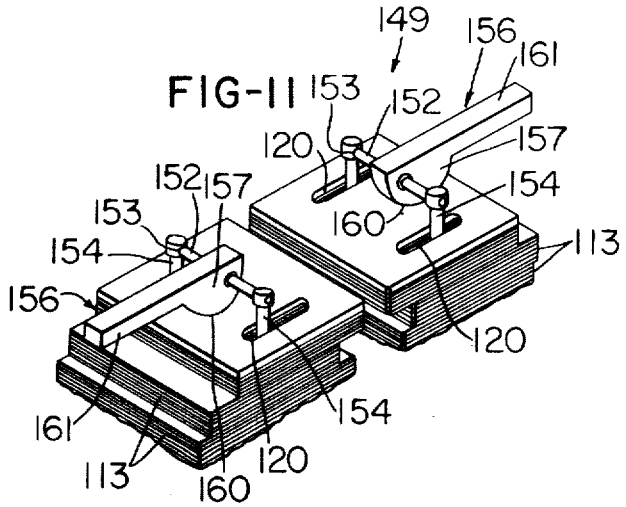
FIG. 11 is a fragmentary perspective view illustrating a typical quick-acting clamp device which may be used interchangeably with the clamp devices shown in FIG. 1 to hold each stack of sheets in position after individually adjusting each sheet of the guide assembly.

In particular, it will be seen that the clamp device illustrated in FIG. 11 comprises a horizontal shaft 152 which is rotatably supported in cylindrical openings 153 provided in the upper portions of rods 154 and is suitably confined against axial movement by cotter pins, or the like, at its opposite ends. The rods 154 extend through openings 120 in sheets 113 comprising each stack and the rods have their lower ends suitably fastened to the work table 44.

A clamping member 156 is suitably fixed to the rod 152 and has a clamping head 157 provided with a cam surface 160 and an actuating arm 161. In operation, the arm 161 of each quick-clamp device is moved upwardly to release a stack of laminated sheets 113 to enable individual adjustment thereof and moved downwardly so that its cam surface 160 engages the top sheet 113 urging it downwardly to clamp the associated stack of sheets firmly in position.

Once each member 22 has plastic material 26 introduced in its channel 23 it may be suitably processed so as to cure and solidify the plastic material in position. It will also be appreciated that various types of plastic materials may be utilized and the curing will be achieved in any manner known in the art and as determined by the properties of the plastic material.

Thus, it is seen that the apparatus 20 is of optimum simplicity and enables the efficient making of a thermally insulated construction 21 at minimum cost. Each elongated rigid member 22 is introduced through the guide assembly 112 into the supporting and moving device whereupon the electrical control system 130 comprising apparatus 20 operates to energize the moving and supporting device 46 to automatically move the member 22 past the dispensing station 51 while simultaneously filling its channel 23 with plastic material. Once the member moves past the dispensing station the control system 130 automatically shuts off the flow of plastic material through the nozzle 33 and stops the moving device 46. The member 22 then has its plastic material suitably cured in position as previously explained.

The cooperating arrangement of the control components of system 130 is such that the speed that a member 22 is moved past the dispensing station 51 may be manually adjusted by control 81 on the motor 80 and the speed of the pump 36 may also be adjusted by a manual speed control provided on the motor 37 which drives such pump whereby the rate of movement of member 22 past the dispensing station and the rate of flow of plastic material may be adjusted in accordance with the volume of the channel 23 to be filled. It will also be noted that electrical system 130 provides substantially automatic operation of the apparatus 20 with the pump 36 operating continuously to provide continuous movement of the plastic material 26, as previously mentioned, and with the motor 80 operating continuously. Once an elongated member is fed through the guide assembly 112 and into position in the supporting and moving device 46 the operation of apparatus 20 provides immediate flow of plastic material at design rates to the nozzle 33 and immediate movement of member 22 at design speed past the dispensing station 51 and along the rectilinear path 50 whereby no delays are encountered in getting both the flow of plastic material up to the desired volume and movement of member 22 at the desired speed which results in efficient filling of channel 23.

The electrical system 130 of thiss example is shown provided with sensing devices in the form of switches 141 and 145; however, it is to be understood that any suitable sensing device may be used such as a photoelectric sensor, or the like.

In this presentation of the invention the apparatus 20 has been provided with an automatic control system to control the movement and filling of each member 22. However, if desired, it will be appreciated that entirely manually operated controls may be provided to control movement of the member 22 past the dispensing station 51 as well as control the flow from nozzle 33.

While present exemplary embodiments of this invention, and methods of practicing the same, have been illustrated and described, it will be recognized that this invention may be otherwise variously embodied and practiced by those skilled in the art.

What is claimed is:

[1. An apparatus for making a themally insulating joint construction by filling an open channel in a straight rigid member with a thermally insulating plastic material, said apparatus comprising a head assembly having a nozzle for dispensing said plastic material at a dispensing station, and a dual-purpose device for supporting and moving said member past said dispensing station, said device including drive means for engaging one side of said member and backup means for engaging the opposite side of said member, at least one of said means resiliently clamping said member against the other means with said channel aligned beneath said nozzle to enable deposition of said plastic material by gravity into said channel.]

[2. An apparatus for making a thermally insulating joint construction comprising, a head assembly having a nozzle for flowing a thermally insulating plastic material therethrough at a dispensing station, a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, and means for positioning said head assembly relative to said rectilinear path to enable precise alignment of said nozzle above and immediately adjacent said channel.]

[3. An apparatus as set forth in claim 2 in which said dual-purpose device provides horizontal movement and vertical support of said member and said positioning means positions said head assembly vertically and horizontally in a direction transverse said rectilinear path.]

[4. An apparatus for making a thermally insulating joint construction comprising a head assembly having a nozzle for flowing a thermally insulating plastic material therethrough at a dispensing station and a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, said dual-purpose device comprising, a driving roller rotatable about a vertical axis and having a right circular cylindrical friction surface which engages one side of said member, a backup roller rotatable about a vertical axis and having a right circular cylindrical surface which engages the opposite side of said member, and a device for urging at least one of said rollers against said member and toward the other roller so that upon rotating said driving roller said member is supported and moved along said rectilinear path.]

[5. An apparatus for making a thermally insulating joint construction comprising a head assembly having a nozzle for flowing a thermally insulating plastic material therethrough at a dispensing station and a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, said dual-purpose device comprising, a driving roller rotatable about a fixed vertical axis and having a right circular cylindrical friction surface which engages one side of said member, a backup roller rotatable about a vertical axis and having a right circular cylindrical surface which engages the opposite side of said member, and a device for urging said backup roller in a yielding manner against said member and toward said driving roller so that upon rotating said driving roller said member is supported horizontally and vertically and moved along said rectilinear path, said urging device enabling members of different sizes to be processed utilizing said apparatus.]

[6. An apparatus as set forth in claim 4 in which said driving roller is driven by a drive shaft which is driven by a variable speed motor to thereby control the speed of said member past said dispensing station.]

[7. An apparatus for making a thermally insulating joint construction comprising a head assembly having a nozzle for flowing a thermally insulating plastic material therethrough at a dispensing station and a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, said dual-purpose device comprising, a pair of driving rollers each rotatable about a fixed vertical axis and each having a right circular cyclindrical friction driving surface which engages one side of said member, one of said driving rollers being driven by a drive shaft and the other of said driving rollers being driven by a gear assembly operatively connected too said drive shaft, a pair of backup rollers each rotatable about a vertical axis and each having a right circular cylindrical surface which engages the opposite side of said member, each of said backup rollers being arranged opposite an associated driving roller, and a device for yielding urging each of said backup rollers against said member and toward its associated driving roller so that upon rotating said driving rollers said member is supported and moved along said rectilinear path.]

8. An apparatus for making a thermally insulating joint construction comprising, a head assembly having a nozzle for flowing a thermally insulating plastic material therethrough at a dispensing station, a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, and an electrical control system for automatically starting [said dual-purpose device and] flow of said plastic material through said nozzle once the forward end portion of each member is placed adjacent said dispensing station and automatically stopping [said dual-purpose device and] said flow of plastic material once the terminal end portion of each member is moved past said dispensing station.

[9. An apparatus as set forth in claim 8 in which said electrical control system comprises a pair of electrical sensing devices, one of said sensing devices operating to start said dual-purpose device and flow of said plastic material and the other of said sensing devices operating to stop said dual-purpose device and flow of said plastic material.]

10. An apparatus for making a thermally insulating joint construction [comprising, a head assembly having a nozzle for flowing a thermally insulating plastic material therethrough at a dispensing station, a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, and an adjustable guide block assembly for guiding each of said members to assure each member is moved in said rectilinear path past said dispensing station,] *by filling an open channel in a straight rigid metal member with a thermally insulating plastic material, said apparatus comprising a head assembly having a nozzle for dispensing said plastic material at a dispensing station, and a device including drive means and backup means for holding said member in position and moving said member along a rectilinear path past said dispensing station with said channel aligned beneath said nozzle to enable deposition of said plastic material into said channel, and an adjustable guide assembly spaced from said device,* said assembly comprising a plurality of [elements cooperating] *individually adjustable sheets whose edge surfaces cooperate with each other* to define *interior* guide surfaces corresponding in configuration to associated *exterior* surfaces of [each] *said* member [moved through said apparatus], *so that said member will pass through said assembly without tending to rotate or move at an angle with respect to said rectilinear path.*

11. An apparatus as set forth in claim 10 in which [said elements comprise individually adjustable sheets,] each of said sheets [having an edge surface which cooperates with edge surfaces of adjoining sheets to define a portion of an associated guide surface and having] *has* an elongated slot extending therethrough [and arranged to extend] in a direction transverse the direction of movement of [each] *said* member through said assembly, said sheets being arranged in a plurality of spaced stacks, *and said assembly further comprises* a plurality of clamping devices corresponding in number to said plurality of stacks [and] *with* each clamping device extending through the elongated slot of each sheet arranged in an associated one of said plurality of stacks, each clamping device enabling positioning of its associated sheets and clamping of its sheets together and against an associated support to define as associated portion of a guide surface.

12. An apparatus as set forth in claim 11 in which each of said clamping devices comprises a member fastened at one end to said support and having a contact member at its opposite end engaging the outer sheet in its stack.

13. An apparatus as set forth in claim 11 in which each of said sheets has another slot provided therein in parallel relation to said first-named slot and said plurality of clamping devices [comprising] *comprise* two clamping devices for each stack with each clamping device extending through an associated set of slots.

14. An apparatus [as set forth in claim 7] *for making a thermally insulating joint construction comprising a head assembly having a nozzle for flowing a thermally insulating plastic material therethrough at a dispensing station and a dual-purpose device for supporting and moving straight rigid members in a rectilinear path past said dispensing station, each of said members having an open channel provided therein and being moved in alignment beneath said nozzle to enable deposition of said plastic material by gravity into each channel to enable filling thereof during movement of each member past said dispensing station, said dual-purpose device comprising, a pair of driving rollers each rotatable about a fixed vertical axis and each having a right circular cylindrical friction driving surface which engages one side of said member, one of said driving rollers being driven by a drive shaft and the other of said driving rollers being driven by a gear assembly operatively connected to said drive shaft, a pair of backup rollers each rotatable about a vertical axis and each having a right circular cylindrical surface which engages the opposite side of said member, each of said backup rollers being arranged opposite an associated driving roller, and a device for yieldingly urging each of said backup rollers against said member and toward its associated driving roller so that upon rotating said driving rollers said member is supported and moved along said rectilinear path,* and further comprising an adjustable guide [block] assembly for guiding each of said members of irregular but substantially constant cross-sectional configuration to assure each member is moved in said rectilinear path past said dispensing station, said assembly comprising a plurality of individually adjustable sheets having edge surfaces which cooperate to define guide surfaces corresponding in configuration to associated surfaces of each member moved through said apparatus.

[15. An adjustable guide block assembly for guiding straight rigid members of irregular but substantially constant cross-sectional configuration for movement therethrough to enable movement of an open channel in each member in aligned relation beneath a nozzle of an associated head assembly to enable the dispensing by gravity of a plastic material within its channel as each member is moved therebeneath, said assembly comprising a plurality of elements cooperating to define guide surfaces corresponding in configuration to associated surfaces of each member moved through said assembly.]

[16. An assembly as set forth in claim 15 in which said elements comprise individually adjustable sheets with each sheet having an edge surface which cooperates with associated edge surfaces of adjoining sheets to define a portion of an associated guide surface.]

17. An [assembly] *apparatus* as set forth in claim [16] *10* in which each *said* edge surface of each sheet is made of an antifriction material.

18. An [assembly] *apparatus* as set forth in claim [15] *10* in which said [elements comprise] individually adjustable sheets *are* made of an antifriction nonmetallic material with each sheet having a substantially planer edge surface which cooperates with associated edge surfaces of adjoining sheets to define a portion of an associated guide surface.

19. An [assembly] *apparatus* as set forth in claim [15] *10* in which [said elements comprise individually adjustable sheets with] each sheet [having] *has* an edge surface which cooperates with edge surfaces of adjoining sheets to define a portion of an associated guide surface and further comprising means for clamping associated sheets together and at a fixed position against an associated support after adjustment thereof to define an associated guide surface.

20. An [assembly as set forth in claim 15] *apparatus for making a thermally insulating joint construction comprising, a head assembly having a nozzle for flowing a thermally insulating plastic material therethrough at a dispensing station, a dual-purpose device for supporting and moving straight rigid members in a rectilinear path past said dispensing station, each of said members having an open channel provided therein and being moved in alignment beneath said nozzle to enable deposition of said plastic material by gravity into each channel to ening in configuration to associated surfaces of each member past said dispensing station, and an adjustable guide block assembly for guiding each of said members to assure each member is moved in said rectilinear path past said dispensing station, said assembly comprising a plurality of elements cooperating to define guide surfaces corresponding in configuration to associated surfaces of each member moved through said apparatus,* in which said elements comprise individually adjustable sheets, each of said sheets having an edge surface which cooperates with edge surfaces of adjoining sheets to define a portion of as associated guide surface and having an elongated slot extending therethrough and arranged to extend in a direction transverse the direction of movement of each member through said assembly, said sheets being arranged in a plurality of spaced stacks, and a plurality of clamping and each clamping device extending through the elongated and each clamping defice extending through the elongated slot of each sheet arranged in an associated one of said plurality of stacks, each clamping device enabling positioning of its associated sheets and clamping of its sheets together and against an associated support to define an associated portion of a guide surface.

[21. An assembly as set forth in claim 20 in which each of said clamping devices comprises a member fastened at one end to said support and having a contact member at its opposite end engaging the outer sheet in its stack.]

[22. An assembly as set forth in claim 20 in which each of said sheets has another slot provided therein in parallel relation to said first-named slot and said plurality of clamping devices comprising two clamping devices for each stack with each clamping device extending through an associated set of slots.]

23. An [assembly] *apparatus* as set forth in claim [20] *11* in which each of said sheets has its edge surface made as a substantially planar surface and further comprising an inclined surface at the forward end of said planar surface and being inclined outwardly away from said surface, said inclined surfaces on said sheets cooperating to define a converging surface which enables easy insertion of the forward end portion of [each] *said* rigid member into said assembly.

[24. An apparatus as set forth in claim 1 in which said dual-purpose device provides horizontal movement and horizontal support of said member.]

[25. An apparatus as set forth in claim 1 in which said dual-purpose device provides horizontal movement and vertical support of said member.]

[26. An apparatus as set forth in claim 1 and further comprising means for guiding said member to ensure movement thereof in said rectilinear path past said dispensing station.]

[27. An apparatus as set forth in claim 1 and further comprising guide means spaced from said dual-purpose device and having surfaces conforming to corresponding surfaces of said member, so that said member will pass through said guide means without tending to rotate or move at an angle with respect to said rectilinear path.]

References Cited

The following references, cited by the Examiner, are of record in the patented file of this patent or the original patent.

UNITED STATES PATENTS

| | | | |
|---|---|---|---|
| 2,931,063 | 4/1960 | Harris | 264—171 |
| 3,040,381 | 6/1962 | Pioch | 425—162 |
| 3,204,324 | 9/1965 | Nilsen | 29—155 |
| 3,210,823 | 10/1965 | Fay et al. | 29—33 |
| 3,396,891 | 8/1968 | De Jong et al. | 226—184 |
| 3,624,885 | 12/1971 | Holliday et al. | 29—200 A |

THOMAS H. EAGER, Primary Examiner

U.S. Cl. X.R.

29—155 R, 200 P

PO-1050
(5/69)

UNITED STATES PATENT OFFICE

CERTIFICATE OF CORRECTION

Patent No. Re. 28,086 Dated July 30, 1974

Inventor(s) W. H. Holliday et al

It is certified that error appears in the above-identified patent and that said Letters Patent are hereby corrected as shown below:

Column 2, line 52, for "par", read --pair--.

Column 3, line 32, for "is", read --in--.

Column 4, line 7, for "and", read --or--.

Column 7, line 20, for "times", read --timer--.

Column 9, line 21, for "thiss", read --this--.

line 39, for "themally", read --thermally--.

Column 10, line 61, for "too", read --to--.

line 66, for "yielding", read --yieldingly--.

Column 12, line 63, for "planer", read --planar--.

Column 13, line 11, for "ing in configuration to associated surfaces", read --able filling thereof during movement--.

line 21, for "as", read --an--.

line 27, for "and each clamping device extending through the elongated", read --devices corresponding in number to said plurality of stacks--.

Signed and sealed this 3rd day of December 1974.

(SEAL)
Attest:

McCOY M. GIBSON JR.
Attesting Officer

C. MARSHALL DANN
Commissioner of Patents